US010219031B2

(12) United States Patent
Mason et al.

(10) Patent No.: US 10,219,031 B2
(45) Date of Patent: *Feb. 26, 2019

(54) WIRELESS VIDEO/AUDIO SIGNAL TRANSMITTER/RECEIVER (71) Applicant: Untethered Technology, LLC, Industry, CA (US)

(72) Inventors: Brian Keith Mason, Yorba Linda, CA (US); Scott David Swanson, Orange, CA (US)

(73) Assignee: Untethered Technology, LLC, Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,101

(22) Filed: Jan. 8, 2018

(65) Prior Publication Data
US 2018/0220187 A1 Aug. 2, 2018

Related U.S. Application Data (63) Continuation of application No. 15/347,043, filed on Nov. 9, 2016, now Pat. No. 9,888,282, which is a continuation of application No. 14/754,561, filed on Jun. 29, 2015, which is a continuation-in-part of application No. 13/693,364, filed on Dec. 4, 2012, now Pat. No. 9,071,866.

(51) Int. Cl.
H04N 21/4363 (2011.01)
H04B 1/02 (2006.01)
H04B 1/06 (2006.01)
H04N 21/41 (2011.01)

(52) U.S. Cl.
CPC ......... *H04N 21/43637* (2013.01); *H04B 1/02* (2013.01); *H04B 1/06* (2013.01); *H04N 21/4122* (2013.01); *H04N 21/43635* (2013.01)

(58) Field of Classification Search
CPC .............. G06F 3/1454; G09G 2370/16; H04N 21/43637; H04N 21/4122; H04N 21/43635; H04B 1/06; H04B 1/02
USPC ................................................. 455/66.1, 566
See application file for complete search history.

(56) References Cited

U.S. PATENT DOCUMENTS 7,499,462 B2    3/2009  MacMullan et al.
9,071,866 B2 *  6/2015  Mason ............ H04N 21/43637
9,888,282 B2    2/2018  Mason et al.
(Continued)

FOREIGN PATENT DOCUMENTS

CN        202383657      8/2012
WO    WO 2014/091317    6/2014

OTHER PUBLICATIONS

International Search Report for PCT Application No. PCT/IB2013/051218 dated Jul. 10, 2013.
(Continued)

Primary Examiner — Eugene Yun
(74) Attorney, Agent, or Firm — Knobbe Martens Olson & Bear LLP (57) ABSTRACT This invention is new to the field in two ways: [1] it sends audio/video signals wirelessly between tablet computing devices and smartphones to projection devices instead of using attached cables, and [2] it does not require an app, a second computing device, a driver, a download, or a "jailbreak" of the computing device to function properly.

6 Claims, 5 Drawing Sheets (56) References Cited

U.S. PATENT DOCUMENTS

| | | |
|---|---|---|
| 2005/0289631 A1 | 12/2005 | Shoemake |
| 2008/0201751 A1 | 8/2008 | Ahmed et al. |
| 2011/0032334 A1 | 2/2011 | Raveendran et al. |
| 2013/0238702 A1 | 9/2013 | Sheth et al. |
| 2016/0156967 A1 | 6/2016 | Mason et al. |
| 2017/0118506 A1 | 4/2017 | Mason et al. |

OTHER PUBLICATIONS

Screenshot of Dec. 21, 2010 youtube.com video: WHDI Over iphone 4, UrLink—Youtube: https://www.youtube.com/watch?v=Qg1cpkJTAo8.

Screenshot of Jun. 28, 2011 youtube.com video: student invention of Wireless Mirroring Android HDMI out 1080p iPhone 4 iPad 2 PlayBook EVO Droid Faire Kansas; UrLink—Youtube: : https://www.youtube.com/watch?v=vueYQI3HObM.

University News, University of Missouri-Kansas City, "A promising invention—mechanical engineering course inspires new product." (printed on Feb. 27, 2015).

Internet Archive WayBack Machine, "Iyuyo", downloaded from http://web.archive.org/web/20110604075436/http://www.iyuyo.com/; (printed on Feb. 27, 2015).

Internet Archive WayBack Machine, "Wireless Connection System," downloaded from http://web.archive.org/web/20111007083458/http://teqavit.com/wireless-connection-systems.html; (printed on Feb. 27, 2015).

Screenshot of Oct. 27, 2010 youtube.com video: Asus and brite-View WHDI Wireless HDMI Transmitter Kits Reviewed—HotHardware; UrLink—Youtube: https://www.youtube.com/watch?v=ox8AJWbWs7o.

Internet Archive WayBack Machine, "System-in-Package (SIP) approach," WHDI transmitter module—ISP090903, downloaded from http://web.archive.org/web/20100903100506/http:/www.insightsip.com/whdi-modules.html; (printed on Feb. 27, 2015).

Engadget: AMIMON crams 1080p streaming into its WHDI Stick, your laptop might have a new BFF, downloaded from http://www.engadget.com/2010/10/05/amimon-crams-1080p-wireless-streaming-into-its-whdi-stick-has-t/; Author: Joanna Stern; published on Oct. 5, 2010 (printed on Feb. 27, 2015).

Engadget: Hisense unveils new consumer WHDI accessories, cable haters rejoice, downloaded from http://www.engadget.com/2011/04/14/hisense-unveils-new-consumer-whdi-accessories-cable-haters-rejo/; (printed on Feb. 27, 2015).

Internet Archive WayBack Machine: Veebeam, Play Anything. Share Anything, downloaded from http://web.archive.org/web/20101123021446/http:/www.veebeam.com/pages/Products.html; (printed on Feb. 27, 2015).

Screenshot of Oct. 21, 2010 youtube.com video: Quick Intro Veebeam; UrLink—Youtube: https://www.youtube.com/watch?v=x_0VhwTVzaw.

Ackerman, Dan, article entitled: "Hands-on: Is Intel's Wireless Display a game changer?," CNET, Tech Culture, downloaded from http://www.cnet.com/news/hands-on-is-intels-wireless-display-a-game-changer/; (printed on Feb. 25, 2015).

Screenshot of Sep. 16, 2010 youtube.com video: Intel brings WiDi technology to tablets; UrLink—Youtube: https://www.youtube.com/watch?v=77wWwzm1Xiw.

Foresman, Chris, article entitled: iPad wireless HD mirroring hack makes for better presentations, A fairly simple hack adds wireless streaming video to the iPad 2, making the . . . , Ars Technica, downloaded from http://arstechnica.com/apple/2011/03/ipad-wireless-hd-mirroring-hack-makes-for-better-presentations/; (printed on Feb. 27, 2015).

Übergizmo: xBounds brings true wireless display mirroring to Android, downloaded from http://www.ubergizmo.com/2011/11/xbounds-true-wireless-display-mirroring-android/; (printed on Feb. 27, 2015).

Screenshot of Oct. 25, 2011 youtube.com video: xBounds @ droidconNL; UrLink—Youtube: https://www.youtube.com/watch?v=ILHEUWzZTOw.

Internet Archive WayBack Machine: Dream Chip, "Wireless Display Technology," downloaded from http://web.archive.org/web/20120110085003/http:/www.dreamchip.de/products/xbounds.html; (printed on Feb. 27, 2015).

Screenshot of Dec. 7, 2011 youtube.com video: xBounds—OpenGL|ES Wireless 3D Display Mirroring (Nov. 2011); UrLink—Youtube: https://www.youtube.com/watch?v=DDcdnhoQ1JI&list=UUh8U8vlg8kjtWbuAQ8iwkhg.

Airtame: Display anything—wirelessly, downloaded from https://airtame.com/; (printed on Feb. 27, 2015).

\* cited by examiner

WIRELESS VIDEO/AUDIO SIGNAL TRANSMITTER/RECEIVER

CROSS-REFERENCE TO RELATED APPLICATIONS

This application is a continuation of U.S. patent application Ser. No. 15/347,043, filed Nov. 9, 2016, and titled "WIRELESS VIDEO/AUDIO SIGNAL TRANSMITTER/RECEIVER," which is a continuation of U.S. patent application Ser. No. 14/754,561, filed Jun. 29, 2015, and titled "WIRELESS VIDEO/AUDIO SIGNAL TRANSMITTER/RECEIVER," which is a continuation of U.S. patent application Ser. No. 13/693,364, now U.S. Pat. No. 9,071,866, filed Dec. 4, 2012, and titled "WIRELESS VIDEO/AUDIO SIGNAL TRANSMITTER/RECEIVER." The above identified application is hereby incorporated by reference herein its entirety and for all purposes.

BACKGROUND OF THE INVENTION

I have invented a wireless audio/video signal transmitter/receiver. One application of this device could be to wirelessly send audio and video signals from a handheld device to a projection device such as a television or other projector.

BRIEF SUMMARY OF THE INVENTION

This device is a tablet computer (e.g., an Apple iPad or similar unit) audio/video accessory consisting of two parts: the first part, a plastic and electrical wiring composite device that attaches to the 'audio/video out' port of the tablet computer and is coupled to a transmitter that sends the tablet's audio and video signals using industry-standard radio frequencies to the second part, which consists of another plastic and electrical wiring composite that is a radio frequency receiver coupled with an MDMI/VGA video attachment. Users attach the transmitter portion to a tablet computer, and the receiver portion to a standard LCD projector or other device such as a television, in order to display the contents of the tablet computer on an LCD projector or television without the use of a VGA cable directly linking the two devices. In summary then, the device consists of two parts, and each part has two distinct but joined sections. The first part consists of an 'audio/video out' section and a radio frequency transmitter; the second part consists of a radio frequency receiver and an HDMI/VGA female connector. Together, these two parts will work in concert to [1] attach to a tablet computer such as an iPad and transmit its audio and video signals wirelessly to the second part which will [2] receive the audio and video signals and convert them to standard HDMI/VGA display and stereo audio format for use with numerous computer monitors, televisions, and projectors.

What are the advantages of this invention? The main advantage this device has over existing devices is that is lets the user roam freely while displaying the contents of a computing tablet such as an iPad; all previous devices are based on a VGA cable connecting the tablet computer directly to a projector; this wireless device allows for a wireless connection more in keeping with the mobile nature of computing tablets such as the Apple iPad. Hence, the main advantage of this wireless audio/video signal transmitter/receiver is that it allows for greater freedom of movement during presentations and teaching sessions.

Although there are other projector connecting devices, they are all cable-based. That makes this connector superior because it is:

More versatile

Less awkward for the user to move about during presentations

More in line with the interactive nature of teaching and presentations

More able to give presenters and teachers the freedom to allow others to use their computing device during a class or presentation while carrying their computing device with them Simpler to use for mobile computing pad presenters Easier to connect since it does not require long, expensive cables Less expensive to connect since long HDMI and VGA cables are very expensive More capable of being customized to varying heights and placements of projectors than a heavy, long cable The principle advantage is to reduce the problem of being tethered to a heavy, thick, long cable while using a light, mobile computing tablet. The wireless nature of this transmitter/receiver means only a very small unit is attached to the mobile tablet, offering a distinct advantage over devices that require being directly connected to an audio/video cable.

DETAILED DESCRIPTION OF THE INVENTION

Figure 1:
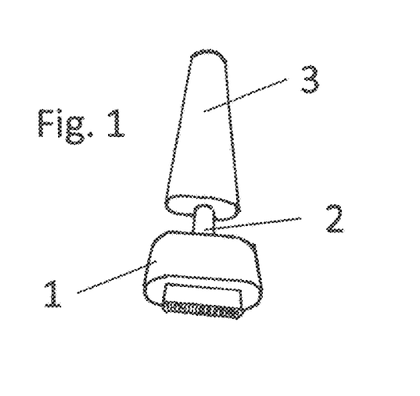
FIGS. 1, 2, and 3 are various views of a transmitter.
Figure 2:
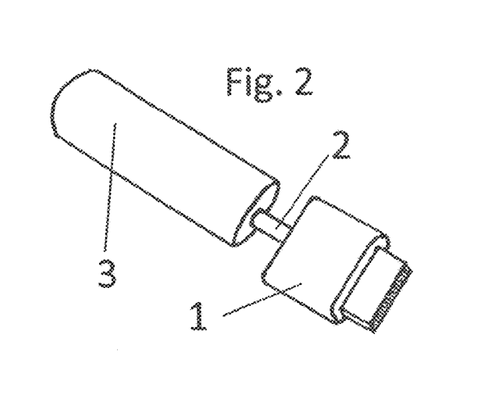
Figure 3:
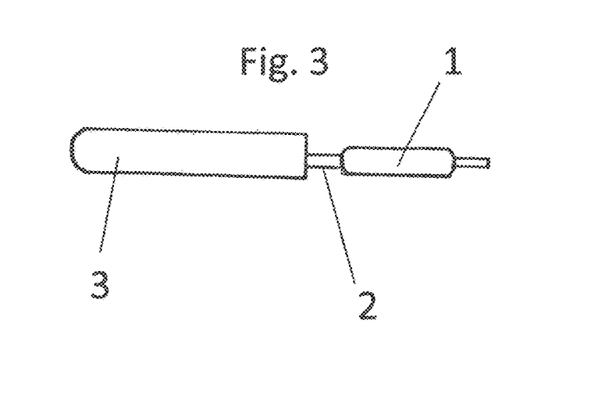
Figure 4:
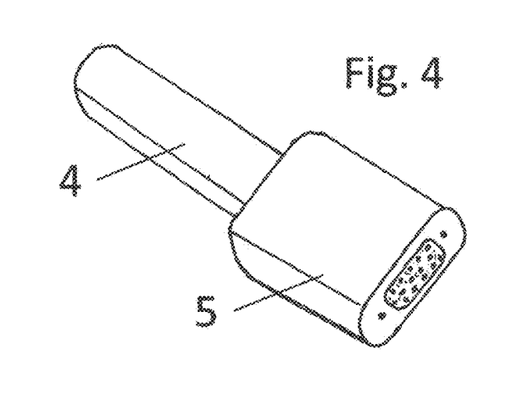
FIGS. 4, 5, and 6 are various views of a receiver.
Figure 5:
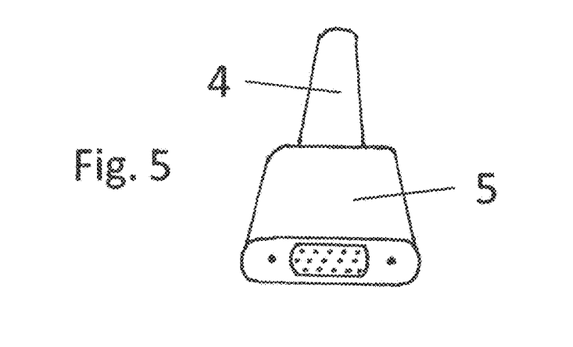
Figure 6:
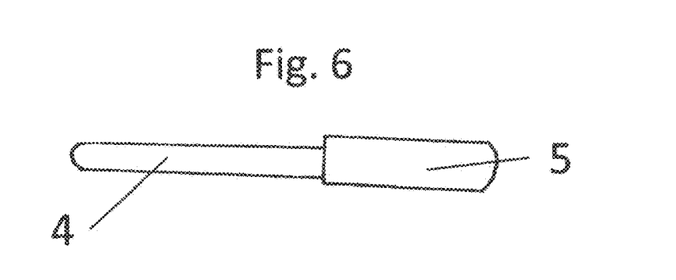
Figure 7:
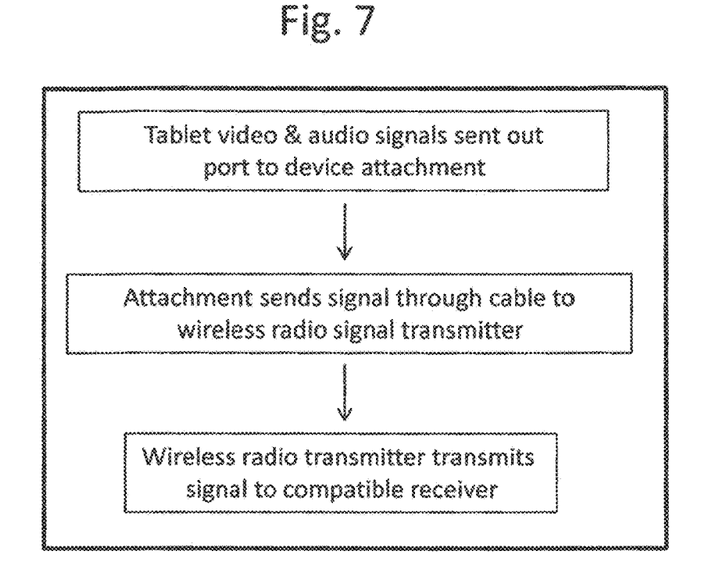
FIGS. 7 and 8 are audio and video flowcharts.
Figure 8:
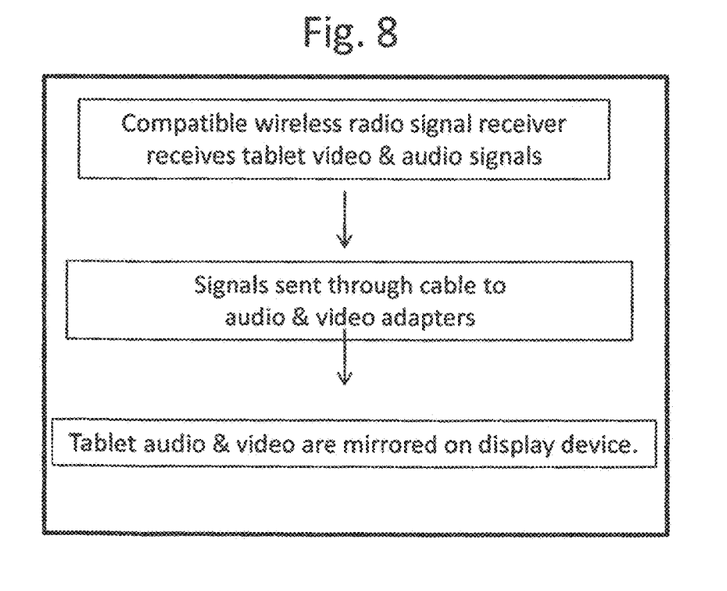
Figure 9:
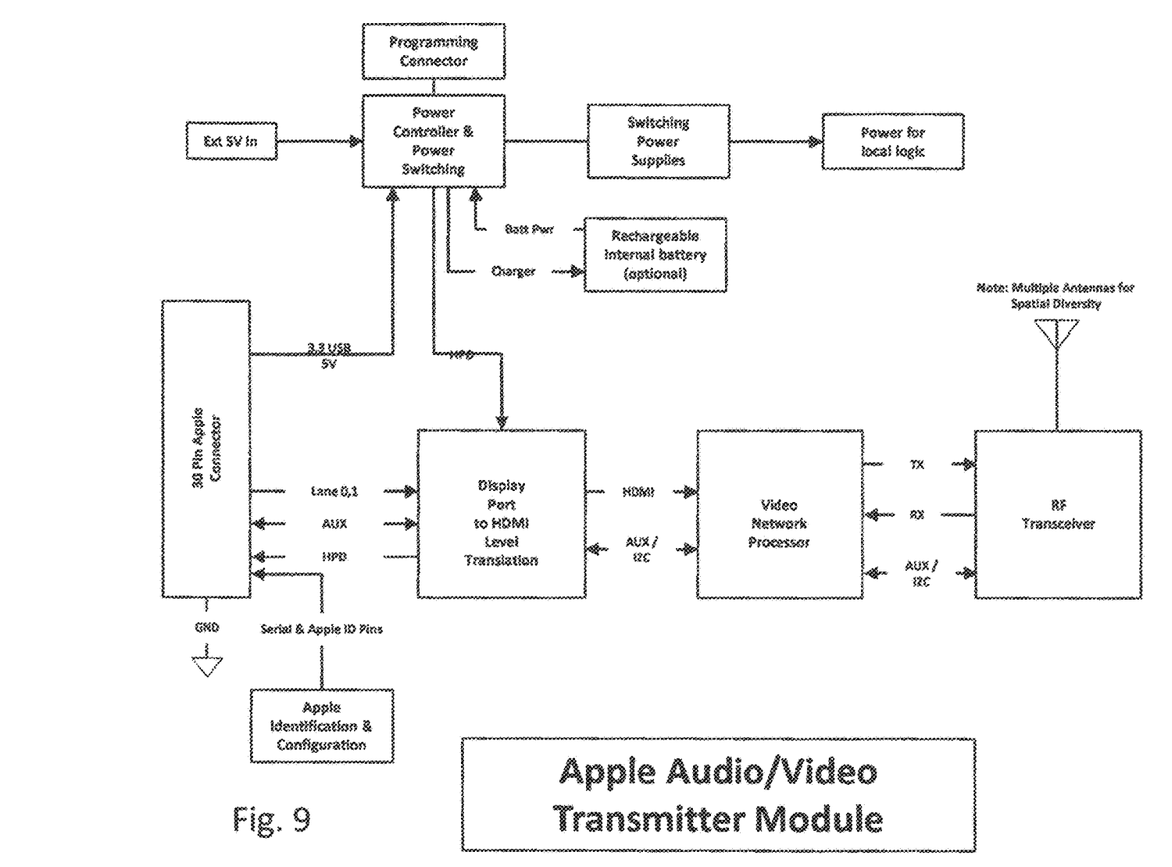
FIGS. 9 and 10 are block electrical diagrams.
Figure 10:
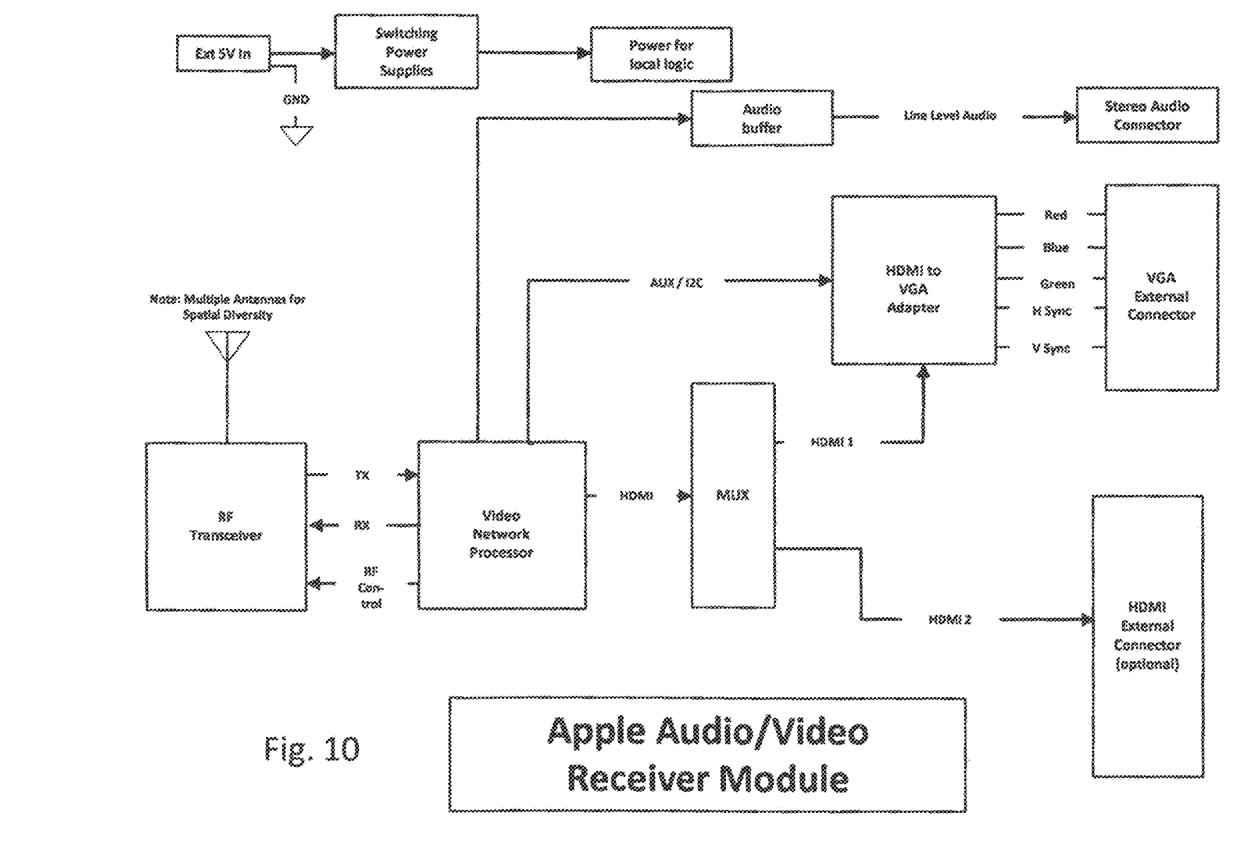

What are the components of the device, and how do they interact? This application includes eight drawings describing the device parts. FIGS. 1, 2, and 3 are various views of the wireless transmitter. FIG. 1 is a side perspective FIGS. 4, 5 and 6 are various views of the wireless receiver. FIGS. 7 and 8 are flow charts indicating how the audio and video signals travel from origination to destination using the wireless transmitter and receiver. FIGS. 9 and 10 are block electrical diagrams of the transmitter and receiver.

More specifically, FIG. 1 is a front elevated view of the transmitter portion of the device, showing a computer tablet attachment 1 as it connects to a cable 2 which sends audio and video signals to a wireless transmitter 3. FIG. 4 then shows a wireless signal receiver 4 attached to a VGA connector 5, which connects to a standard computer monitor, LCD projector, flat screen television, or other display device.

How does the invention achieve its result? The technological computing landscape has been changed drastically in the recent past by the proliferation of mobile computing pads. These pads offer long battery life, powerful display features, and a high degree of mobility. However, technology to display the contents of these mobile computing pads, such as the Apple iPad, currently are based on long clunky cables that tie the user to a specific location when presenting information from such a tablet device. This restriction of movement goes against the grain of the mobility inherent in these computing pads and tablets. Therefore a wireless device, which increases the mobility of the presenter while still allowing the contents of the computing pad to be displayed to a large audience, would be both effective and desirable.

How the wireless audio/video signal transmitter/receiver achieves its result (see FIG. 7 and FIG. 8): The purpose of this device, its desired result, is to send the audio/video signal of a mobile computing pad to a display device wirelessly, without the use of a bulky cable that tethers the device to one location.

How the device achieves this result (see FIG. 2): A user attaches the transmitter portion of the device to a mobile computing tablet using 1. The audio/video signal from the tablet travels from 1 through the wires in 2 to the transmitter 3 as shown in FIG. 2. That signal travels wirelessly to the receiver 4 in FIG. 4 where it is then sent to a VGA connector 5 in FIG. 4. This connector 5 attaches to any number of standard VGA male connectors on monitors and projectors, thus sending the audio/video signal from the mobile tablet to a display device. As shown specifically in FIGS. 9 and 10, a power controller and power switch supplies the transmitter with power through a 5 volt supply and an internal rechargeable battery for local logic, a programming connector, and also to an HPD to a display port HDMI level translator and a 30-pin Apple connector. The HDMI level translator communicates with an auxiliary integrated circuit to a video network processor and an RF transceiver with multiple antennas for spatial diversity. The audio and video signal from the iOS or other handheld computing tablet or smartphone device is thus sent to a receiver. The receiver uses a grounded 5V power supply and multiple antennas for spatial diversity to receive the sent audio and video signals into a video network processor as HDMI. This then flows into an MUX device that separates HDMI 1 and HDMI 2 signals; 1 is sent to an HDMI to VGA adapter; while #2 is sent to an HDMI external connector. The VGA adapter then runs RGB and HSynch/VSynch signals to an external VGA connector; the video networking 'in' processor also separates the stereo audio signal into an on-board audio buffer, through a line level audio apparatus, and into a stereo audio connector. The end user connects this receiver to a projection device such as an LCD projector, television, or other display device, and then wirelessly mirrors the display of the handheld computing tablet device onto the television or other display.

Description of components: A Video Graphics Array (VGA) connector is a three-row 15-pin DE-15 connector. The 15-pin VGA connector is found on many video cards, computer monitors, and some high definition television sets. A DE-15 is also conventionally called an RGB connector.

DE-15 is also conventionally called an RGB connector, or HD15 (High Density, to distinguish it from the older and less flexible DE-9 connector used on older VGA cards, which has the same shell size but only two rows of pins). VGA connectors and cables carry analog component RGBHV (red, green, blue, horizontal sync, and vertical sync) video signals, and video display data. The same VGA connector can be used with a variety of supported VGA resolutions, ranging from 640×400 px @70 Hz (24 MHz of signal bandwidth) to 1280×1024 px @85 Hz (160 MHz) and up to 2048×1536 px @85 Hz (388 MHz). This makes the connector compatible with a wide range of projection devices, from standard computer monitors to LCD projectors to HD televisions.

In a female DE15 socket (the side contained in the proposed new device), Pin 1 is RED for red video, Pin 2 is GREEN for green video, Pin 3 is BLUE for blue video, Pin 4 is ID2/RES, formerly Monitor ID bit 2, and is reserved; Pin 5 is a GND for Ground (HSync), Pin 6 is RED_RTN for red return, Pin 7 is GREEN_RTN for green return, Pin 8 BLUE_RTN is for blue return, Pin 9 is KEY/PWR formerly key, now +5V DC, Pin 10 is GND for Ground (VSync, DDC), Pin 11 is ID0/RES formerly Monitor ID bit 0 and is reserved, Pin 12 is ID1/SDA, Pin 13 is HSync for the horizontal sync, Pin 14 is VSync for the vertical sync, and Pin 15 is ID3/SCL for Monitor ID bit 3. This detailed listing is for the 15-pin VESA DDC2/E-DDC connector; the pin numbering is that of a female connector functioning as the graphics adapter output. In the male connector, this pin numbering corresponds with the mirror image of the cable's wire-and-solder side. The device's receiver part would have a 'female' VGA attachment. VGA production is well-known and well-established. Its production history is by its designer, IBM based on the D-subminiature architecture from 1987 to the present day.

HDMI is a compact audio/video interface for transferring uncompressed digital audio/video data from an HDMI-compliant device ("the source device") to a compatible digital audio device, computer monitor, video projector, or digital television. Because HDMI is electrically compatible with the CEA-861 signals used by digital visual interface (DVI), no signal conversion is necessary, nor is there a loss of video quality when a DVI-to-HDMI adapter is used. As an uncompressed CEA-861 connection, HDMI is independent of the various digital television standards used by individual devices, such as ATSC and DVB, as these are encapsulations of compressed MPEG video streams (which can be decoded and output as an uncompressed video stream on HDMI).

For digital audio, if an HDMI device supports audio, it is required to support the baseline format: stereo (uncompressed) PCM. Other formats are optional, with HDMI allowing up to 8 channels of uncompressed audio at sample sizes of 16-bit, 20-bit and 24-bit, with sample rates of 32 kHz, 44.1 kHz, 48 kHz, 88.2 kHz, 96 kHz, 176.4 kHz and 192 kHz. HDMI also supports any IEC 61937-compliant compressed audio stream, such as Dolby Digital and DTS, and up to 8 channels of one-bit DSD audio at rates up to four times that of Super Audio CD. With version 1.3, HDMI supports lossless compressed audio streams Dolby TrueHD and DTS-HD Master Audio.

Some tablet computers, such as the Microsoft Surface, Motorola Xoom, BlackBerry PlayBook, Vizio Vtab 1008 and Acer Iconia Tab A500, support HDMI using Micro-HDMI (Type D) ports. Others, such as the ASUS Eee Pad Transformer support the standard using Mini-HDMI (Type C) ports. The iPad has a special A/V adapter that converts Apple's data line to a standard HDMI (Type A) port. Samsung has a similar proprietary thirty-pin port for their Galaxy Tab 10.1 that can adapt to HDMI as well as USB drives. The Dell Streak 5 smartphone/tablet hybrid is capable of outputting over HDMI. While the Streak uses a PDMI port, a separate cradle is available which adds HDMI compatibility. Most of the Chinese made tablets running Android OS support HDMI output using a Mini-HDMI (Type C) port. Most new laptops and desktops now have built in HDMI as well. Many recent mobile phones support output of HDMI video via either a mini-HDMI connector or MHL output.

Next, wireless communication between the two parts of the device. Wireless communications is the transfer of information between two points (in this case, the transmitter portion and the receiver portion of the device) that are physically not connected. Distances can be long or short, as a few meters as in this example. The device's two parts could be constructed using the block diagrams attached to this description by any competent electrical engineer. Other common and frequently-used examples of wireless technology include GPS units, garage door openers, wireless computer mice, and cordless telephones. The wireless operation referred to here permits short range communications that are impractical to implement with the use of wires or cables. Since the idea behind tablet computing is mobility, especially when teaching, training, or delivering information to audiences, wireless frees the presenter from being cabled to the front of a classroom or auditorium; such cabling limits the presenter's movements and restricts their ability to move around the room interact with their audience Furthermore, wireless allows a teacher to lend control of the tablet computer to students or attendees, increasing their interaction with the device and the material being presented without having to leave their seat.

The term wireless is commonly used to refer to systems (e.g. radio transmitters and receivers, remote controls, computer networks, network terminals, etc.) which use some form of energy such as radio frequency (RF) to transfer information without the use of wires. Information is transferred in this manner over both short and long distances—for the purposes of this device, that distance would not exceed 20 meters.

The transmitter module is an electronic component using a variety of radio signals to remote control the target device which has a built-in receiver module. RF modules are widely used in garage door openers, wireless alarm systems, industrial remote controls and wireless home automation systems as well as classroom tools including wireless teaching tablets such as eInstruction's "Mobi" and Smart Technology's "SMART Tablet." The same technology is used in the receiver portion of the device.

What are alternative ways that the invention can achieve its result? The way the device parts are shown in FIGS. 2 and 4, the transmitter portions are joined by a cable, and the receiver portions are not. However, the invention could achieve its result in the following alternative ways:

Both parts could have their sections joined by a cable;
Neither part could have their sections joined by a cable,
The transmitter could be cable-free, and
The receiver could have a cable.

The idea behind a cable on the transmitter is to allow it more flexibility when moving around the room; if a presenter bumped a chair or table or desk with the device, the cable will flex and prevent damage to that section. But the device could achieve its result by:

Both parts having cables,
Both parts not having cables, or
Either part having or not having a cable.

Different sizes and lengths of transmitters and receivers can be used. Bluetooth™ or any other wireless send-receive technology can be used in place of radio frequency technology in both the transmitter and the receiver. The mobile computing device video out attachment is shown as one for an Apple iPad; it can be altered to fit numerous other devices, including but not limited to the Motorola Xoom, the Samsung Galaxy Tab, the BlackBerry PlayBook, the Kindle Nook, the Kindle Fire, the HP TouchPad, the Microsoft Surface, and any number of other mobile tablet computers and computer netbooks, as well as laptop and notebook computers.

The invention claimed is:

1. A system for wirelessly mirroring video from a mobile device to a display screen, the system comprising:
a transmitter device comprising:
a communications connector configured to electronically connect to a standard communications port on a mobile device;
a first one or more video and audio signal processors electronically connected to the communications connector and preconfigured to provide communications with a second one or more video and audio signal processors, the first one or more video and audio signal processors configured to:
receive a video and audio signal from the mobile device via the communications connector;
generate, based on the video and audio signal received from the mobile device, an HDMI video and audio signal; and
generate, based on the HDMI video and audio signal, a wireless network transmission signal;
a first antenna; and
a first RF transceiver electronically connected to the first one or more video and audio signal processors and to the first antenna, the first RF transceiver configured to communicate the wireless network transmission signal wirelessly to a second RF transceiver via the first antenna and without retransmission by additional wireless networking devices; and
a receiver device preconfigured for operation with the transmitter device, the receiver device comprising:
a second antenna;
an HDMI output connector configured to electronically connect to an HDMI input port on a display screen;
the second RF transceiver electronically connected to the second one or more video and audio signal processors and to the second antenna, the second RF transceiver configured to receive the wireless network transmission signal from the first RF transceiver via the second antenna and communicate the wireless network transmission signal to the second one or more video and audio signal processors; and
the second one or more video and audio signal processors electronically connected to the HDMI output connector and preconfigured to provide communications with the first one or more video and audio signal processors, the second one or more video and audio signal processors configured to:
receive the wireless network transmission signal from the second RF transceiver;
generate, based on the wireless network transmission signal, the HDMI video and audio signal; and
output the HDMI video and audio signal to the display screen via the HDMI output connector.

2. The system according to claim 1, wherein the mobile device comprises at least one of: a table computing device or a smartphone computing device.

3. The system according to claim 2, wherein the display screen comprises at least one of: a monitor, a television, or a projector.

4. The system according to claim 3, wherein the transmitter device further comprises a first housing configured to house the first video and audio signal processor, the first antenna, and the first RF transceiver.

5. The system according to claim 4, wherein the receiver device further comprises a second housing configured to house the second video and audio signal processor, the second antenna, and the second RF transceiver.

6. The system according to claim 4, wherein the receiver device is integrated into the display screen.

* * * * *

UNITED STATES PATENT AND TRADEMARK OFFICE
CERTIFICATE OF CORRECTION

PATENT NO. : 10,219,031 B2
APPLICATION NO. : 15/865101
DATED : February 26, 2019
INVENTOR(S) : Brian Keith Mason It is certified that error appears in the above-identified patent and that said Letters Patent is hereby corrected as shown below:

On the Title Page

Item (63), Related U.S. Application Data at Line 4, Change "continuation-in-part" to --continuation--.

In the Specification

Column 1 Line 38, Change "MDMI/" to --HDMI/--.

Column 5 Line 12, Change "audience" to --audience.--.

Signed and Sealed this
Fourth Day of June, 2019

Andrei Iancu
*Director of the United States Patent and Trademark Office*